Jan. 8, 1952     M. C. BRADY     2,581,625
MEANS FOR REDUCING PROPELLER VIBRATIONAL EFFECTS
Filed Dec. 17, 1946     2 SHEETS—SHEET 1

Merle C. Brady
INVENTOR.

BY
HIS PATENT ATTORNEY

Jan. 8, 1952 M. C. BRADY 2,581,625
MEANS FOR REDUCING PROPELLER VIBRATIONAL EFFECTS
Filed Dec. 17, 1946 2 SHEETS—SHEET 2

Merle C. Brady
INVENTOR.

BY James M. Clark

HIS PATENT ATTORNEY

Patented Jan. 8, 1952

2,581,625

UNITED STATES PATENT OFFICE 2,581,625

MEANS FOR REDUCING PROPELLER VIBRATIONAL EFFECTS

Merle C. Brady, San Diego, Calif., assignor to Consolidated Vultee Aircraft Corporation, a corporation of Delaware Application December 17, 1946, Serial No. 716,751

7 Claims. (Cl. 244—129)

The present invention relates to sound and vibration absorption and more particularly to means for reducing noise and vibrational effects produced in aircraft and other vehicles by rotating propellers.

Contrary to popular belief the propellers cause substantially all of the noise produced by aircraft in flight and but a minor portion of the total noise is caused by the engine. The tip pressure wave and tip wash created by the rapidly rotating blades of aircraft propellers produce objectionable vibrations in the sides of the body or fuselage of the aircraft and such vibrations cause fatigue of the structure as well as creating the greater part of the objectionable noises. This tip pressure wave, or tip wash, causing most of the noise which is manifest to both the occupants of the aircraft as well as to persons upon the ground, is appreciably augmented as deflected waves or echoes from the metallic sides of the aircraft body and other adjacent structure. Many efforts have been made to acoustically damp or eliminate these noises which emanated from the propeller and this invention is directed to simplified and localized means for minimizing its effects.

The present invention is accordingly directed primarily to the provision of sound and vibration absorbing means, preferably in the form of resilient, or resiliently-mounted panels supported upon the sides of the fuselage, or other body, in the area of the propeller slap for deflecting and absorbing the vibrations which are set up by the propeller tip pressures or wash. It is accordingly a major object of this invention to provide improved means for absorbing the vibrations due to propeller rotation as well as to prevent their transmission into the fuselage structure. It is a further object to protect the body structure of an aircraft, or other vehicle by suitably absorbing the propeller slap and vibration and minimizing the fatigue and sound effects which these vibrations cause.

It is a further object of this invention to provide sound and vibration absorbing means which are relatively light in weight, inexpensive to construct and to apply to the body structure and which are highly efficient in respect to their size and disposition upon the aircraft body with respect to the propeller location. A further object includes a novel structural arrangement of such vibration insulating panels both with respect to their individual construction and the manner of their attachment to the fuselage structure. Other objects and advantages of the present invention will become apparent to those skilled in the art after reading the following description taken together with the accompanying drawing, forming a part hereof, in which:

Figure 1:
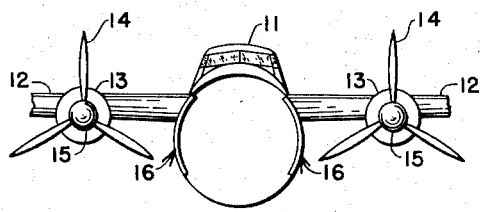
Fig. 1 is a front elevational view of a multi-engined aircraft showing the relative location of the propellers and a form of the vibration reducing panels of the present invention.
Figure 2:
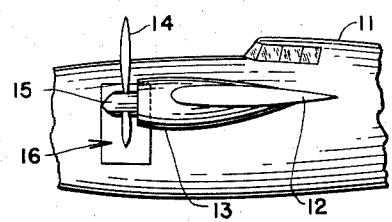
Fig. 2 is a side elevational view of a like portion of the aircraft shown in Fig. 1.

Referring now to Figs. 1 and 2, the numeral 11 indicates the fuselage or central body portion of an aircraft which is supported in flight by the wing 12. The latter has attached thereto the wing nacelles 13 enclosing suitable power plants which drive the tractor propellers comprised of the multiple blades 14 which are provided at their root portions with spinners 15. The arrangement of the airplane shown fragmentarily in these figures has been selected for illustrative purposes only and it will be understood that the present invention is equally applicable to other types of aircraft having entirely different arrangements of its wings, power plants and other components, as well as to other propeller-driven vehicles. The improved sound and vibration insulating panels comprising the present invention are indicated in these figures by the numeral 16, being disposed at each side of the fuselage 11 facing the axis of rotation of the propellers and disposed fore and aft of the propeller plane of rotation. Each insulating panel 16 preferably extends in a circumferential direction to equal extents above and below a radial line extending from the center of the fuselage to the axis of rotation of the propellers 14. In the case of a fuselage of other than cylindrical shape, or circular cross-section, these panels would preferably extend to either side of a line drawn from the propeller shaft axis normal to the side wall of the fuselage, or other body. The upper and lower limits of the insulating panel is preferably determined by experiment and test, and may preferably terminate at point in which the radial lines from the propeller shaft axis make oblique angles with respect to the fuselage sides.

Figure 3:
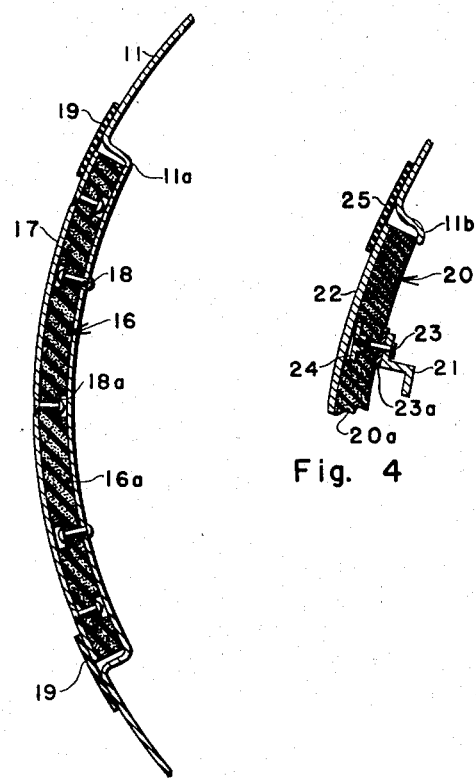
Fig. 3 is a cross-sectional detailed view of a vibration insulating panel attached within a depressed portion of the fuselage skin.

A preferred form of the insulating panels 16 of Figs. 1 and 2, is shown in greater detail in the cross-section of Fig. 3. In this figure, the panel 16 is comprised of a sponge rubber pad 16a which is attached to the metal outer plate 17 by means of the rivets 18 and the washers 18a. This panel 16 rests directly against a recessed portion 11a of the skin of the fuselage 11, and is attached thereto by additional rivets 18 and washers 18a. The joints formed around the periphery of the panel 16 are preferably covered by the rubber fairing strips 19 which may be cemented or otherwise attached to the fuselage skin 11 and to the adjacent edges of the panel 16. Through the use of these panels the propeller tip pressure wave, or tip wash, will be partially deflected by the metal and partially absorbed by the elastic support in such manner that the pressure waves or wash will be prevented from striking the fuselage directly and setting up vibrations therein. The insulated supports further reduce vibration of the fuselage sides and attended vibratory noises to a minimum, and decrease fatigue of the aircraft structure.

Figures 4, 5:
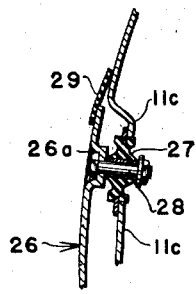
Fig. 4 is a fragmentary view of a further vibration insulating panel attached to the fuselage frame-work.
Fig. 5 is a modified form of insulating panel supported upon rubber mounts.

The modified form of construction shown in Fig. 4 shows a similar panel supported within an opening in the wall of a fuselage the skin of which is dimpled or depressed as at 11b around the opening and across which longérons or stringers 21 extend in a longitudinal direction. The insulating panel 20, of this modification, may preferably also comprise a sponge rubber pad 20a vulcanized to an outer metal plate 22 and attached to the structural stringers 21 by the nuts 23, the washers 23a and the nut plates 24, which are preferably cemented to the rubber pad. As in the case of the modification shown in Fig. 3 the gap around the edges of the plate may preferably be covered by the rubber fairing strips 25.

Fig. 5 discloses a further form of vibration insulating panel 26 comprising a metal plate formed to the shape of the fuselage and attached to the dimpled or recessed skin portion 11c thereof by the use of rubber shock-absorbing mounts. The wall plate 26 is preferably provided with a plurality of recessed portions 26a and apertured at those points at which it is to be attached to the fuselage skin 11c. The latter is also adjacently apertured to receive the rubber shear mounting units 27 having a peripheral flange which is attached to the skin 11c and vulcanized to a cylindrical or tubular sleeve through which the through-bolts 28 are inserted and serve to fasten the plate 26 to the recessed skin 11c. External pressures exerted upon the wall plate 26 will force the bushing 27a, the mount 27 and the through-bolt 28 inwardly serving to deflect and place the rubber in the mount unit 27 in shear which deflection absorbs vibrations set up in wall plate 26. As in the case of the above modifications, a rubber fairing strip 29 may be provided to fill the gap between the edge 26 and the depressed edges of the fuselage skin 11c. Through the use of various types of resilient mountings, shown and described in connection with Figures 3, 4, and 5 there is no direct connection or contact between the deflector plates 17, 22 and 26 and the fuselage 11 and thus vibrations will not be transmitted to the fuselage structure. It will be readily understood that other types of elastic or resilient mountings may be employed to suit particular types of fuselage constructions and to meet the specific requirements of individual installations.

Figure 6:
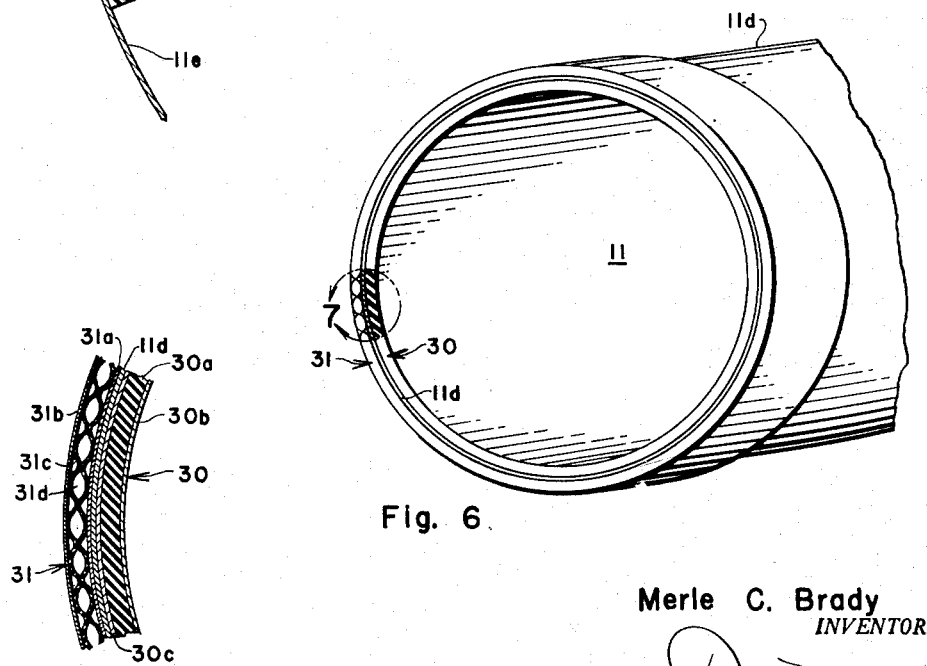
Fig. 6 shows a fragmentary portion of an aircraft fuselage which is insulated both internally and externally in the region of the propellers.
Figure 7:
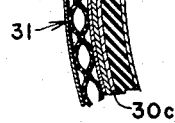
Fig. 7 is a detailed portion of the internal and external lining indicated in Fig. 6.

A more complete construction for eliminating the transmission of sound and vibrations into the fuselage is shown in Figs. 6 and 7. In this modification the skin 11d of the airplane fuselage 11 serves as an impervious septum between an outer sound-proofing layer 31 and an inner layer 30 of sound and vibration absorbing material. It will be noted that the layers 30 and 31 are used to line both the interior and exterior of the fuselage circumference in the area adjacent the propellers or in the plane of the propeller disc. The inner layer 30, as shown in the detail section in Fig. 7, may preferably be a sponge rubber pad 30a attached to the surface sheets 30b and 30c to form an insulating panel or sandwich which is in turn attached to the interior surface of the fuselage skin 11d. The outer panel 31 is preferably formed of two skin sheets 31a and 31b vulcanized or cemented to a core made up of corrugated rubber sheets, the corrugations or undulations forming air cells 31d which absorb the vibration and noises, and reduce the transmission thereof to a minimum. The air cells, in the modification shown in Fig. 7, may also preferably be filled with carbon dioxide gas, which has a lower transmission quality than air, (in the ratio of 846 to 1188,) and therefore forms a highly efficient insulated panel of the air mattress type.

Figure 8:
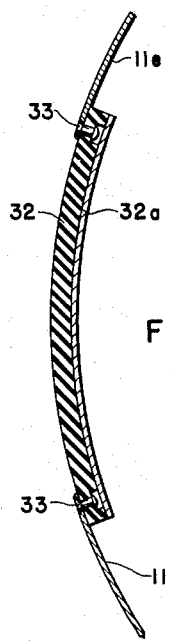
Fig. 8 is a further form of vibration insulating panel attached to an opening within the aircraft body.

In Fig. 8, there is shown a simple form of insulating panel 32 cemented or otherwise bonded to a metal plate 32a which serves to close an opening in the fuselage skin 11e of the airplane. The insulating pad 32 may preferably be of metallized rubber, rubber-covered felt or similarly covered glass wool. In the case of the use of felt or glass wool, the rubber exterior covering serves to protect the fibrous material from the airstream and the elements but this rubber covering is not required where the pad of metallized rubber is used. These pads may be attached to the adjacent edges of the fuselage skin 11e by the rivets 33 and this type insulating panel provides a simple construction and effective guard against the transmission of propeller vibrations to the fuselage.

It will accordingly be seen that the present invention consisting essentially of a metal plate or rubber panel insulated from contact with the airplane fuselage in the area of the propeller slap serves to materially reduce vibration of the fuselage sides and attendant vibratory noises to a minimum, while at the same time decreasing fatigue of the aircraft structure. Other forms and modifications of the present invention, both with respect to the general arrangement of the panel and the details of its respective elements, which become apparent to those skilled in the art upon reading this description, are intended to come within the scope and spirit of the present invention as more particularly defined in the appended claims.

I claim:

1. A vibration absorption construction for an aircraft body, said body having an exterior skin indented at a predetermined local area subjected to propeller slap, shear type rubber shock-absorbing mounts supported from said indented skin portion, a metallic sheet fitted into said indented skin portion in a flush relationship with said aircraft body skin and supported by said rubber mounts for the isolation of vibrations from said indented skin portion.

2. A vibration absorption construction for an aircraft having a body, a propeller rotatably supported upon the aircraft in a position in which the plane of rotation of said propeller intersects a portion of said body, said body having an exterior skin indented at the region within the plane of said propeller rotation subjected to vibration therefrom, shear type shock-absorbing mounts supported from said indented skin portion, and a skin sheet fitted within said indented skin portion substantially flush with said exterior skin supported by said shock-absorbing mounts for the isolation of said vibrations.

3. Vibration protective construction for an aircraft having propellers and a fuselage, said fuselage having inwardly offset side wall portions within a predetermined local area adjacent the propellers of the aircraft, insulating panels exteriorly attached to said offset side wall areas of said fuselage and resilient means for attaching said panels to said inwardly offset side wall portions of said aircraft fuselage.

4. A vibration absorption construction for an aircraft body, said body having an exterior skin indented at a predetermined local area subjected to propeller vibrations, shock-absorbing mounts supported from said indented skin portion, a sheet element fitted into said indented skin portion in a substantially flush relationship with said aircraft body skin, said sheet element supported by said shock-absorbing mounts for preventing transmission of vibrations to said indented skin portion.

5. A vibration absorption construction for an aircraft body, said body having an exterior skin indented at a predetermined local area subjected to propeller vibrations, shock-absorbing means supported from said indented skin portion, a sheet element fitted into said indented skin portion in a substantially flush relationship with said aircraft body skin, attachment means between said sheet element and said shock-absorbing means for the isolation of vibrations from said indented skin portion, and means for fairing the edges of said sheet element and said indented skin portion.

6. A vibration absorption construction for an aircraft having a body, a propeller rotatably supported upon the aircraft in a position in which the plane of rotation of said propeller intersects a portion of said body, said body having its skin structure indented at the region within the plane of said propeller rotation subjected to vibration therefrom, shock-absorbing mounts supported from said indented skin portion, and a skin sheet element fitted within said indented skin portion substantially flush with said adjacent skin structure supported by said shock-absorbing mounts for the isolation of said vibrations.

7. A vibration absorption construction for an aircraft having a body, a propeller rotatably supported upon the aircraft in a position in which the plane of rotation of said propeller intersects a portion of said body, said body having an exterior skin indented at the region within the plane of said propeller rotation subjected to vibrations therefrom, shock-absorbing means supported from said indented skin portion, a skin sheet disposed within said indented skin portion and supported by said shock-absorbing mounts for the isolation of said vibration, and means for fairing the joint between said skin sheet and said exterior skin indented portion.

MERLE C. BRADY.

REFERENCES CITED

The following references are of record in the file of this patent:

UNITED STATES PATENTS

| Number | Name | Date |
| --- | --- | --- |
| 1,853,317 | Packer | Apr. 12, 1932 |
| 1,972,005 | Berbeck | Aug. 28, 1934 |
| 1,991,832 | Zand | Feb. 19, 1935 |
| 2,095,626 | Bassett et al. | Oct. 12, 1937 |
| 2,111,326 | Norris | Mar. 15, 1938 |
| 2,160,066 | Frische | May 30, 1939 |
| 2,382,817 | Reiss | Aug. 14, 1945 |